(12) United States Patent
Jung et al.

(10) Patent No.: US 7,890,419 B2
(45) Date of Patent: Feb. 15, 2011

(54) VIRTUAL CREDIT IN SIMULATED ENVIRONMENTS

(75) Inventors: Edward K. Y. Jung, Bellevue, WA (US);
 Royce A. Levien, Lexington, MA (US);
 Mark A. Malamud, Seattle, WA (US);
 John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 11/974,515

(22) Filed: Oct. 12, 2007

(65) Prior Publication Data

US 2008/0177650 A1 Jul. 24, 2008

Related U.S. Application Data

(63) Continuation-in-part of application No. 11/069,905, filed on Feb. 28, 2005, now Pat. No. 7,774,275, and a continuation-in-part of application No. 11/051,514, filed on Feb. 4, 2005.

(51) Int. Cl.
 *G06Q 40/00* (2006.01)
(52) U.S. Cl. .......................................... 705/38; 705/35
(58) Field of Classification Search ..................... 705/38
 See application file for complete search history.

(56) References Cited

U.S. PATENT DOCUMENTS

| | | |
|---|---|---|
| 4,569,526 A | 2/1986 | Hamilton |
| 5,192,854 A | 3/1993 | Counts |
| 5,203,848 A | 4/1993 | Wang |
| 5,241,466 A | 8/1993 | Perry et al. |
| 5,323,315 A | 6/1994 | Highbloom |
| 5,333,868 A | 8/1994 | Goldfarb |
| 5,513,129 A | 4/1996 | Bolas et al. |

(Continued)

FOREIGN PATENT DOCUMENTS

EP  1 326 170 A1  7/2003

(Continued)

OTHER PUBLICATIONS

U.S. Appl. No. 12/291,349, Jung et al.

(Continued)

*Primary Examiner*—Charles R Kyle
*Assistant Examiner*—Seth Weis
(74) *Attorney, Agent, or Firm*—Keller LaPuma Woodard PC

(57) ABSTRACT

A method and system provides for the use of credit arrangements in simulated environments. A user can participate in credit transactions involving purchases of virtual products, virtual services, and virtual items of value. Feedback is provided to the user regarding results of the credit transactions. In some embodiments multiple users can make simulated purchases or incur simulated credit obligations that are posted to virtual accounts, and the multiple users can also make simulated compensation against balances due or obligations owed for said virtual accounts. The user is also provided with an opportunity of engaging in real-world financial transactions related to the virtual credit arrangement. In some implementations of the system and method, multiple players at different locations can use virtual charge accounts and/or real world financial accounts in connection with arranging or resolving a virtual credit transaction.

34 Claims, 10 Drawing Sheets

U.S. PATENT DOCUMENTS

| | | |
|---|---|---|
| 5,643,088 A | 7/1997 | Vaughn et al. |
| 5,651,117 A | 7/1997 | Arbuckle |
| 5,696,965 A | 12/1997 | Dedrick |
| 5,788,574 A | 8/1998 | Ornstein et al. |
| 5,791,991 A | 8/1998 | Small |
| 5,795,228 A | 8/1998 | Trumbull et al. |
| 5,802,296 A | 9/1998 | Morse et al. |
| 5,806,045 A | 9/1998 | Biorge et al. |
| 5,808,612 A | 9/1998 | Merrick et al. |
| 5,823,879 A | 10/1998 | Goldberg et al. |
| 5,870,030 A | 2/1999 | DeLuca et al. |
| 5,884,029 A | 3/1999 | Brush, II et al. |
| 5,890,995 A | 4/1999 | Bobick et al. |
| 5,926,179 A | 7/1999 | Matsuda et al. |
| 5,937,391 A | 8/1999 | Ikeda et al. |
| 5,946,664 A | 8/1999 | Ebisawa |
| 5,956,038 A | 9/1999 | Rekimoto |
| 5,964,660 A | 10/1999 | James et al. |
| 5,964,661 A | 10/1999 | Dodge |
| 5,978,780 A | 11/1999 | Watson |
| 6,009,458 A | 12/1999 | Hawkins et al. |
| 6,024,643 A | 2/2000 | Begis |
| 6,036,601 A | 3/2000 | Heckel |
| 6,057,856 A | 5/2000 | Miyashita et al. |
| 6,106,395 A | 8/2000 | Begis |
| 6,119,229 A | 9/2000 | Martinez et al. |
| 6,135,646 A | 10/2000 | Kahn et al. |
| 6,152,856 A | 11/2000 | Studor et al. |
| 6,246,991 B1 | 6/2001 | Abe et al. |
| 6,251,017 B1 | 6/2001 | Leason et al. |
| 6,253,193 B1 | 6/2001 | Ginter et al. |
| 6,267,675 B1 | 7/2001 | Lee |
| 6,330,547 B1 | 12/2001 | Martin |
| 6,332,127 B1 | 12/2001 | Bandera et al. |
| 6,375,466 B1 | 4/2002 | Juranovic |
| 6,450,407 B1 | 9/2002 | Freeman et al. |
| 6,467,686 B1 | 10/2002 | Guthrie et al. |
| 6,476,830 B1 | 11/2002 | Farmer et al. |
| 6,505,773 B1 | 1/2003 | Palmer et al. |
| 6,523,829 B1 | 2/2003 | Walker et al. |
| 6,545,682 B1 | 4/2003 | Ventrella et al. |
| 6,591,250 B1 * | 7/2003 | Johnson et al. ............... 705/51 |
| 6,609,970 B1 | 8/2003 | Luciano, Jr. |
| 6,616,533 B1 | 9/2003 | Rashkovskiy |
| 6,625,578 B2 | 9/2003 | Spaur et al. |
| 6,632,142 B2 | 10/2003 | Keith |
| 6,643,751 B2 | 11/2003 | Rosenquist et al. |
| 6,663,105 B1 | 12/2003 | Sullivan et al. |
| 6,672,961 B1 | 1/2004 | Uzun |
| 6,726,427 B2 | 4/2004 | Jarvis et al. |
| 6,729,884 B1 | 5/2004 | Kelton et al. |
| 6,769,691 B1 | 8/2004 | Kim |
| 6,791,549 B2 | 9/2004 | Hubrecht et al. |
| 6,793,580 B2 | 9/2004 | Sinclair et al. |
| 6,850,643 B1 | 2/2005 | Smith, II et al. |
| 6,884,166 B2 | 4/2005 | Leen et al. |
| 6,935,952 B2 | 8/2005 | Walker et al. |
| 6,954,728 B1 | 10/2005 | Kusumoto et al. |
| 6,965,868 B1 | 11/2005 | Bednarek |
| 7,020,632 B1 | 3/2006 | Kohls et al. |
| 7,054,830 B1 | 5/2006 | Eggleston et al. |
| 7,055,740 B1 | 6/2006 | Schultz et al. |
| 7,115,034 B2 | 10/2006 | Kuwahara |
| 7,124,088 B2 | 10/2006 | Bauer et al. |
| 7,147,562 B2 | 12/2006 | Ohara et al. |
| 7,169,051 B1 | 1/2007 | Mossbarger |
| 7,169,501 B2 | 1/2007 | Suganuma et al. |
| 7,228,260 B2 | 6/2007 | Fujino et al. |
| 7,249,139 B2 | 7/2007 | Chuah et al. |
| 7,275,987 B2 | 10/2007 | Shimakawa et al. |
| 7,289,130 B1 | 10/2007 | Satoh et al. |
| 7,319,992 B2 | 1/2008 | Gaos |
| 7,373,377 B2 | 5/2008 | Altieri |
| 7,483,857 B2 | 1/2009 | Bansal et al. |
| 7,523,486 B1 | 4/2009 | Turner |
| 7,593,864 B2 * | 9/2009 | Shuster ....................... 705/26 |
| 7,614,944 B1 | 11/2009 | Hughes et al. |
| 7,620,592 B2 | 11/2009 | O'Mara et al. |
| 7,672,884 B2 | 3/2010 | Schuster et al. |
| 7,690,997 B2 | 4/2010 | Van Luchene et al. |
| 7,698,178 B2 | 4/2010 | Chu |
| 7,722,453 B2 | 5/2010 | Lark et al. |
| 2001/0027430 A1 | 10/2001 | Sabourian |
| 2001/0037316 A1 | 11/2001 | Shiloh |
| 2001/0047328 A1 | 11/2001 | Triola |
| 2001/0056383 A1 | 12/2001 | Shuster |
| 2001/0056399 A1 | 12/2001 | Saylors |
| 2002/0013722 A1 | 1/2002 | Kanaga |
| 2002/0016655 A1 | 2/2002 | Joao |
| 2002/0019744 A1 | 2/2002 | Yamamoto |
| 2002/0022516 A1 | 2/2002 | Forden |
| 2002/0029252 A1 | 3/2002 | Segan et al. |
| 2002/0032037 A1 | 3/2002 | Segawa |
| 2002/0073043 A1 | 6/2002 | Herman et al. |
| 2002/0087465 A1 | 7/2002 | Ganesan et al. |
| 2002/0090985 A1 | 7/2002 | Tochner et al. |
| 2002/0091635 A1 | 7/2002 | Dilip et al. |
| 2002/0095375 A1 | 7/2002 | Taneda et al. |
| 2002/0095523 A1 | 7/2002 | Shimakawa et al. |
| 2002/0113809 A1 | 8/2002 | Akazawa et al. |
| 2002/0125312 A1 | 9/2002 | Ogilivie |
| 2002/0128952 A1 | 9/2002 | Melkomian et al. |
| 2002/0138445 A1 | 9/2002 | Laage et al. |
| 2002/0152155 A1 | 10/2002 | Greenwood et al. |
| 2002/0152156 A1 | 10/2002 | Tyson-Quah |
| 2002/0174055 A1 | 11/2002 | Dick et al. |
| 2002/0178120 A1 | 11/2002 | Reid et al. |
| 2002/0188760 A1 | 12/2002 | Kuwahara |
| 2003/0014266 A1 | 1/2003 | Brown et al. |
| 2003/0014423 A1 | 1/2003 | Chuah et al. |
| 2003/0036987 A1 | 2/2003 | Omiya |
| 2003/0037101 A1 | 2/2003 | Torabi |
| 2003/0046689 A1 | 3/2003 | Gaos |
| 2003/0064807 A1 | 4/2003 | Walker et al. |
| 2003/0069787 A1 | 4/2003 | Tendon et al. |
| 2003/0097331 A1 | 5/2003 | Cohen |
| 2003/0105688 A1 | 6/2003 | Brown et al. |
| 2003/0107173 A1 | 6/2003 | Satloff et al. |
| 2003/0115132 A1 | 6/2003 | Iggland |
| 2003/0118575 A1 | 6/2003 | Grob et al. |
| 2003/0144940 A1 | 7/2003 | Kochansky et al. |
| 2003/0154092 A1 | 8/2003 | Bouron et al. |
| 2003/0155715 A1 | 8/2003 | Walker et al. |
| 2003/0187768 A1 | 10/2003 | Ryan et al. |
| 2003/0216184 A1 | 11/2003 | Kigoshi |
| 2004/0051718 A1 | 3/2004 | Bennett et al. |
| 2004/0058731 A1 | 3/2004 | Rossides |
| 2004/0073488 A1 | 4/2004 | Etuk et al. |
| 2004/0082377 A1 | 4/2004 | Seelig et al. |
| 2004/0133472 A1 | 7/2004 | Leason et al. |
| 2004/0148221 A1 | 7/2004 | Chu |
| 2004/0158492 A1 | 8/2004 | Lopez et al. |
| 2005/0021472 A1 * | 1/2005 | Gettman et al. ............... 705/52 |
| 2005/0043094 A1 | 2/2005 | Nguyen et al. |
| 2005/0060260 A1 | 3/2005 | Masuda et al. |
| 2005/0137015 A1 | 6/2005 | Rogers et al. |
| 2005/0137904 A1 | 6/2005 | Lane et al. |
| 2005/0148388 A1 | 7/2005 | Vayra et al. |
| 2005/0153766 A1 | 7/2005 | Harmon |
| 2005/0177492 A1 | 8/2005 | Camping |
| 2005/0182693 A1 | 8/2005 | Alivandi |
| 2005/0192071 A1 | 9/2005 | Matsuno et al. |
| 2005/0203835 A1 | 9/2005 | Nhaissi et al. |
| 2005/0216346 A1 | 9/2005 | Kusumoto et al. |

| 2005/0235008 | A1 | 10/2005 | Camping et al. |
| 2005/0288963 | A1 | 12/2005 | Parrish |
| 2006/0080613 | A1 | 4/2006 | Savant |
| 2006/0111934 | A1 | 5/2006 | Meggs |
| 2006/0206376 | A1 | 9/2006 | Gibbs et al. |
| 2006/0224480 | A1 | 10/2006 | Bent et al. |
| 2006/0234795 | A1 | 10/2006 | Dhunjishaw et al. |
| 2007/0087820 | A1 | 4/2007 | Van Luchene et al. |
| 2007/0087822 | A1 | 4/2007 | Van Luchene |
| 2007/0117615 | A1 | 5/2007 | Van Luchene |
| 2007/0179867 | A1 | 8/2007 | Glazer et al. |
| 2008/0139318 | A1 | 6/2008 | Van Luchene et al. |
| 2009/0204420 | A1 | 8/2009 | Ganz |

FOREIGN PATENT DOCUMENTS

| JP | 11143944 A | 5/1999 |
| WO | WO 02/20111 A2 | 3/2002 |
| WO | WO 02/067178 A1 | 8/2002 |
| WO | WO 02/077758 A2 | 10/2002 |
| WO | WO 2005/064502 A1 | 7/2005 |

OTHER PUBLICATIONS

U.S. Appl. No. 12/291,336, Jung et al.
U.S. Appl. No. 12/291,160, Jung et al.
U.S. Appl. No. 12/291,020, Jung et al.
U.S. Appl. No. 12/290,679, Jung et al.
U.S. Appl. No. 12/005,047, Jung et al.
U.S. Appl. No. 12/004,110, Jung et al.
U.S. Appl. No. 12/290,674, Jung et al.
U.S. Appl. No. 12/290,653, Jung et al.
U.S. Appl. No. 12/290,458, Jung et al.
U.S. Appl. No. 12/290,358, Jung et al.
U.S. Appl. No. 11/982,393, Jung et al.
U.S. Appl. No. 11/981,635, Jung et al.
U.S. Appl. No. 11/980,315, Jung et al.
U.S. Appl. No. 11/975,723, Jung et al.
U.S. Appl. No. 11/975,367, Jung et al.
U.S. Appl. No. 11/974,174, Jung et al.
U.S. Appl. No. 11/906,777, Jung et al.
U.S. Appl. No. 11/827,376, Jung et al.
Baig, Edward C.; "Slip into a second skin with an online avatar"; USA Today; bearing a date of Nov. 11, 2003; pp. 1-3; located at http://www.usatoday.com/tech/columnist/edwardbaig/2003-11-11-baig_x.htm; printed on Apr. 1, 2008.
Bartle, Richard A.; "Designing Virtual Worlds: Bibliography"; bearing a date of Jun. 17, 2003; pp. 1-36; located at http://www.mud.co.uk/dvw/bibliography.html; printed on Mar. 24, 2008.
Burgess et al.; "Controlling the Virtual World: Governance of On-Line Communities"; bearing a date of 1999; pp. 1-2; located at http://cse.stanford.edu/classes/cs201-projects-98-99/controlling-the-virtual-world/case/index.html; printed on Mar. 24, 2008; Stanford University.
Castronova, Edward; "Virtual Worlds: A First-Hand Account of Market and Society on the Cyberian Frontier"; bearing a date of Dec. 2001; pp. 1-40; located at http://papers.ssrn.com/abstract=294828; Munich, Germany.
Rhode, Steve; "Avoid credit card balance transfers requiring new purchases"; Gannett News Service; bearing a date of Jul. 18, 2003; pp. 1-3; Myvesta.org Inc.; printed on Apr. 8, 2008.
"Star Wars Galaxies: An Empire Divided"; Adventure Manual; bearing a date of Jun. 26, 2003; total pp. 1-9; LucasFilm Entertainment Company Ltd.
"Star Wars Galaxies: An Empire Divided"; Adventure Manual; bearing a date of Jun. 26, 2003; total pp. 75; LucasFilm Entertainment Company Ltd.
"There, Inc. Delivers a Brave New Online World to Consumers; Company Unveils There 'Limited Access' and Teams With Industry Leaders Including ATI, HP, and iVillage to Provide Consumers with compelling 3D World; Nike and Levi's Provide Immersive Brand Experience to Members."; Goliath Business Knowledge on Demand; bearing a date of Oct. 27, 2003; pp. 1-7; PR Newswire; Menlo Park, CA; printed on Apr. 8, 2008.
U.S. Appl. No. 12/221,446, filed Jul. 31, 2008, Jung et al.
U.S. Appl. No. 12/221,459, filed Jul. 31, 2008, Jung et al.
U.S. Appl. No. 12/221,447, filed Jul. 31, 2008, Jung et al.
U.S. Appl. No. 12/221,254, filed Jul. 30, 2008, Jung et al.
U.S. Appl. No. 12/220,675, filed Jul. 24, 2008, Jung et al.
Bloomfield, Robert; "Patenting Virtual World Commerce"; Metanomics—Business and Policy in the Metaverse; bearing a date of Jun. 21, 2008; printed on Jun. 25, 2008; pp. 1-2; located at http://www.metanomics.net/21-jun-2008/patenting-virtual-commerce.
Bloomfield, Robert; "Patenting Virtual World Commerce"; TerraNova; bearing a date of Jun. 21, 2008; printed on Jun. 25, 2008; pp. 1-5; located at http://terranova.blogs.com/terra_nova/2008/06/last-week-i-rec.html#more.
U.S. Appl. No. 11/654,398, Jung et al.
U.S. Appl. No. 11/653,092, Jung et al.
U.S. Appl. No. 11/652,379, Jung et al.
U.S. Appl. No. 11/642,991, Jung et al.
U.S. Appl. No. 11/607,794, Jung et al.
U.S. Appl. No. 11/605,939, Jung et al.
U.S. Appl. No. 11/601,599, Jung et al.
U.S. Appl. No. 11/600,602, Jung et al.
U.S. Appl. No. 11/599,631, Jung et al.
U.S. Appl. No. 11/589,318, Jung et al.
U.S. Appl. No. 11/582,837, Jung et al.
U.S. Appl. No. 11/540,911, Jung et al.
U.S. Appl. No. 11/364,895, Jung et al.
U.S. Appl. No. 11/364,498, Jung et al.
U.S. Appl. No. 11/342,368, Jung et al.
U.S. Appl. No. 11/340,832, Jung et al.
U.S. Appl. No. 11/314,967, Jung et al.
U.S. Appl. No. 11/305,878, Jung et al.
U.S. Appl. No. 11/283,551, Jung et al.
U.S. Appl. No. 11/274,759, Jung et al.
U.S. Appl. No. 11/264,824, Jung et al.
U.S. Appl. No. 11/256,695, Jung et al.
U.S. Appl. No. 11/251,624, Jung et al.
U.S. Appl. No. 11/242,647, Jung et al.
U.S. Appl. No. 11/242,619, Jung et al.
U.S. Appl. No. 11/238,684, Jung et al.
U.S. Appl. No. 11/236,875, Jung et al.
U.S. Appl. No. 11/234,878, Jung et al.
U.S. Appl. No. 11/234,867, Jung et al.
U.S. Appl. No. 11/234,848, Jung et al.
U.S. Appl. No. 11/234,847, Jung et al.
U.S. Appl. No. 11/228,043, Jung et al.
U.S. Appl. No. 11/213,442, Jung et al.
U.S. Appl. No. 11/203,686, Jung et al.
U.S. Appl. No. 11/202,964, Jung et al.
U.S. Appl. No. 11/192,342, Jung et al.
U.S. Appl. No. 11/192,320, Jung et al.
U.S. Appl. No. 11/191,252, Jung et al.
U.S. Appl. No. 11/191,248, Jung et al.
U.S. Appl. No. 11/191,233, Jung et al.
U.S. Appl. No. 11/185,524, Jung et al.
U.S. Appl. No. 11/185,446, Jung et al.
U.S. Appl. No. 11/184,567, Jung et al.
U.S. Appl. No. 11/107,381, Jung et al.
U.S. Appl. No. 11/107,380, Jung et al.
U.S. Appl. No. 11/096,265, Jung et al.
U.S. Appl. No. 11/096,212, Jung et al.
U.S. Appl. No. 11/069,906, Jung et al.
U.S. Appl. No. 11/069,905, Jung et al.
U.S. Appl. No. 11/069,894, Jung et al.
U.S. Appl. No. 11/068,736, Jung et al.
"About Deposits and Withdrawals"; Project Entropia; pp. 1; located at http://www.project-entropia.com/Content.ajp?id=1303; printed on Jan. 27, 2005.
"About Project Entropia"; Project Entropia; pp. 1; located at http://www.project-entropia.com/about/Index.ajp; printed on Jan. 27, 2005.
"Bank Account Game"; pp. 1-2; located at http://www.educational-learninggames.com/bank-account-game.asp; Educational Learning Games.com; printed on Dec. 10, 2004.

Becker, David; "Real cash for virtual goods"; CNET News.Com; bearing a date of Feb. 8, 2005; pp. 1-4; CNET Networks, Inc.; located at http://news.com.com/2102-1043_3-5566704.html?tag=st.util.print; printed on Feb. 8, 2005.

"Charge It! Math and Money Board Games"; pp. 1-2; located at http://www.educationallearninggames.com/charge-it-board-game-money-board-game.asp; Educational Learning Games.com; printed on Jan. 27, 2005.

"IGE Frequently Asked Questions"; IGE; pp. 1-12; located at http://www.ige.com/FrequentyAskedQuestions.aspx; printed on Jan. 27, 2005.

"Monopoly Tycoon"; Atari Australia & New Zealand; pp. 1; located at http://www.atari.com.au/games/info.do?id=191; Atari Australia Pty Ltd.; printed on Mar. 1, 2005.

"Our Business"; IGE; bearing a date of 2001-2004; pp. 1-2; located at http://www.ige.com/corporate.aspx?lang=en; printed on Jan. 27, 2005.

"Penn State Behrend Establishes Credit Card Research Center"; Penn State Erie: The Behrend College; bearing dates of Nov. 22, 2004 and Sep. 27, 2004; pp. 1-2; located at http://www.pserie.psu.edu/newscal/news2004/november-creditcenter.htm; printed on Dec. 8, 2004.

"Spending Challenge"; The Mint: It Makes Cents; bearing a date of 2002; pp. 1-3; Northwestern Mutual; located at http://www.themint.org/tryit/spendingchallenge.php; printed on Jan. 26, 2005.

Terdiman, Daniel; "Virtual Trade Tough Nut to Crack"; Wired News; bearing a date of Dec. 20, 2004; pp. 1-3; Lycos Inc.; located at http://wired.com/news/print/0,1294,66074,00.html; printed on Jan. 27, 2005.

"The Entertainment of the Future is already here"; Project Entropia; bearing a date of Jan. 27, 2005; pp. 1; located http://www.project-entropia.com/Index.ajp; printed on Jan. 27, 2005.

U.S. Appl. No. 12/286,532, Jung et al.
U.S. Appl. No. 12/286,530, Jung et al.
U.S. Appl. No. 12/286,127, Jung et al.
U.S. Appl. No. 12/286,096, Jung et al.
U.S. Appl. No. 12/231,298, Jung et al.

Biggs, Stuart; "Enter danger zone, Matrix-style Governments worry about the hazardous reality-blurring effects of online gaming"; South China Morning Post; bearing a date of Aug. 30, 2005; pp. 1-2; © 2005 South China Morning Post Publishers Ltd.

Krotoski, Aleks; "Online: Virtual trade gets real: Buying virtual goods on the internet is one thing; killing for it is quite another"; The Guardian; bearing a date of Jun. 16 2005; pp. 1-5; ProQuest; London (UK); printed on Nov. 10, 2009.

Kushner, David; "My Avatar, My Self"; Technology Review; bearing a date of Apr. 2004; pp. 50-55; vol. 107 No. 3; printed on Nov. 9, 2009.

Langberg, Mike; "Virtual World There Innovative to an Extent"; bearing a date of Nov. 27, 2003; San Jose Mercury News; p. 1G; printed on Nov. 9, 2009.

Stephens, Molly; "Sales of in-game assets: An illustration of the continuing failure of intellectual property law to protect digital creators"; Texas Law Review; bearing a date of May 2002; pp. 1513-1535; vol. 80, No. 6; printed on Nov. 6, 2009.

White, Mark; "War of the Worlds"; Independent on Sunday; bearing a date of Jul. 31, 2005; pp. 1-4; Financial Times; © 2005 Independent Digital UK Ltd.

U.S. Appl. No. 12/658,618, Jung et al.
U.S. Appl. No. 12/658,613, Jung et al.
U.S. Appl. No. 12/658,609, Jung et al.
U.S. Appl. No. 12/658,600, Jung et al.

Bartle, Richard A.; "Pitfalls of Virtual Property"; Themis Group; bearing a date of Apr. 2004; pp. 1-22.

Grimmelmann, James; "Virtual Worlds As Comparative Law"; New York Law School Law Review; bearing a date of Dec. 8, 2004; pp. 147-184; vol. 49.

U.S. Appl. No. 12/661,997, Jung et al.
U.S. Appl. No. 12/661,996, Jung et al.

"MicroLoans take offbeat collateral"; The Wall Street Journal. Sunday Gazette—Mail; Bearing a date of Feb 13, 2005; p. 5.D; Charleston, W.V.; printed on Apr. 19, 2010.

European Search Report; European App. No. EP 06 78 8839; Aug. 11, 2010 (received by our Agent on Aug. 12, 2010); pp. 1-6.

* cited by examiner

VIRTUAL CREDIT IN SIMULATED ENVIRONMENTS

CROSS-REFERENCE TO RELATED APPLICATIONS

The present application is related to and claims the earliest available effective filing date(s) from the following listed applications (the "Related Applications") (e.g., claims earliest available priority dates for other than provisional patent applications; claims benefits under 35 USC §119(e) for provisional patent applications, for any and all parent, grandparent, great-grandparent, etc. applications of the Related Applications(s)).

RELATED APPLICATIONS

For purposes of the USPTO extra-statutory requirements, the present application constitutes a continuation in part of U.S. application Ser. No. 11/051,514 entitled VIRTUAL CREDIT IN SIMULATED ENVIRONMENTS, naming Edward K. Y. Jung, Royce A. Levien, Mark A. Malamud, and John D. Rinaldo, Jr., as inventors, filed Feb. 4, 2005, which is currently co-pending, or is an application of which a currently co-pending application is entitled to the benefit of the filing date.

For purposes of the USPTO extra-statutory requirements, the present application constitutes a continuation in part of U.S. application Ser. No. 11/069,905 entitled PAYMENT OPTIONS FOR VIRTUAL CREDIT, naming Edward K. Y. Jung, Royce A. Levien, Mark A. Malamud, and John D. Rinaldo, Jr., as inventors, filed Feb. 28, 2005, now U.S. Pat. No. 7,774,275, or is an application of which a currently co-pending application is entitled to the benefit of the filing date.

TECHNICAL FIELD

This application relates generally to financial transactions in virtual world environments.

BACKGROUND

Financial systems in the modern world include many techniques for purchasing things of value. Charge accounts, checking accounts, credit cards, and debit cards are conventional ways for engaging in financial transactions without having to exchange cash or currency as part of the financial transaction.

Virtual world environments often include imaginary characters participating in fictional events, activities and transactions. There are both educational and entertainment benefits in creating new and challenging ways to relate virtual world environments with real-world experiences.

SUMMARY

This disclosure describes a method and system for a virtual credit arrangement that enables a user to have simulated credit transactions. Feedback is communicated to the user regarding results of the simulated credit transactions. Responsive to the simulated credit transactions, the user is provided an option of engaging in real-world financial transactions related to the virtual credit arrangement.

In one aspect of the method and system, a virtual account is provided to a user. The user is enabled to make simulated purchases of foods and/or services and/or items of value. The user receives feedback regarding results of the simulated purchases. Responsive to an experience of making the simulated purchases and receiving the feedback, a transition by the user to usage of an actual financial account is facilitated. A further aspect relates to selection of credit terms for simulated purchases of virtual goods and/or services and/or items of value. In some embodiments, certain virtual account terms are programmed—e.g. automatically by a machine under program control—based on user demographic information or other past performance records. In other embodiments certain virtual account terms are varied by the user.

In some embodiments, users are enabled to make simulated purchases or incur simulated credit obligations that are posted to virtual accounts, and users are enabled to make simulated compensation against balances due or obligations owed for virtual accounts. In some instances, users are enabled to make remuneration with something of real value. In other instances, users are enabled to make remuneration with something of virtual value.

The completion of performance benchmarks may be required in some embodiments before allowing transfer to a higher participation level of a virtual credit account. Completion of performance benchmarks may be required before facilitating transition of a user to an actual financial account. In some instances, a user may have an unrestricted option to make transition to an actual financial account.

In some implementations, the system and method provides a simulated environment that enables purchases of various virtual products and/or virtual services and/or virtual items to be made by a plurality of users at different locations. Such purchases may involve credit transactions based on role playing world activities.

Additional features, aspects and benefits will be understood by those skilled in the art from the following drawings and detailed description for various exemplary and preferred embodiments.

DETAILED DESCRIPTION

Figure 1:
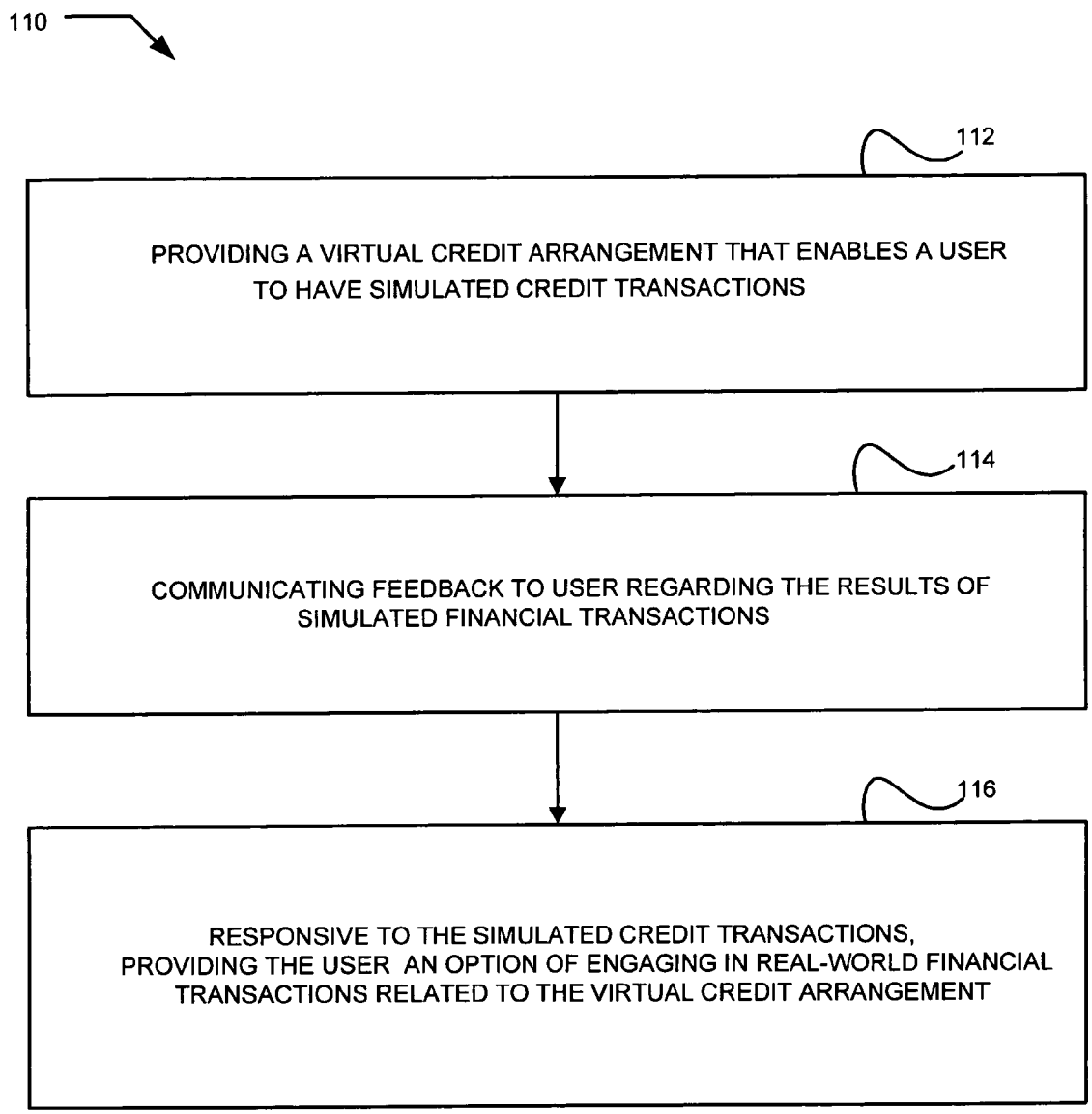
FIG. 1 is a high level flow chart showing an exemplary process for some embodiments.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Referring to a process 110 shown in the exemplary flow chart of FIG. 1, a virtual credit arrangement is provided in order to enable a user to have simulated credit transactions (block 112). Feedback is communicated to the user regarding results of the simulated financial transactions (block 114). Responsive to the simulated credit transactions, the user is provided with an option of engaging in real-world financial transactions (block 116) related to the virtual credit arrangement. As discussed in more detail herein, such virtual credit arrangements can involve various types of credit arrangements made by the user, under standard or customized credit terms that may involve different forms of compensation such as real-world money, fictional money, action commitments, bartered items, etc.

Figure 2:
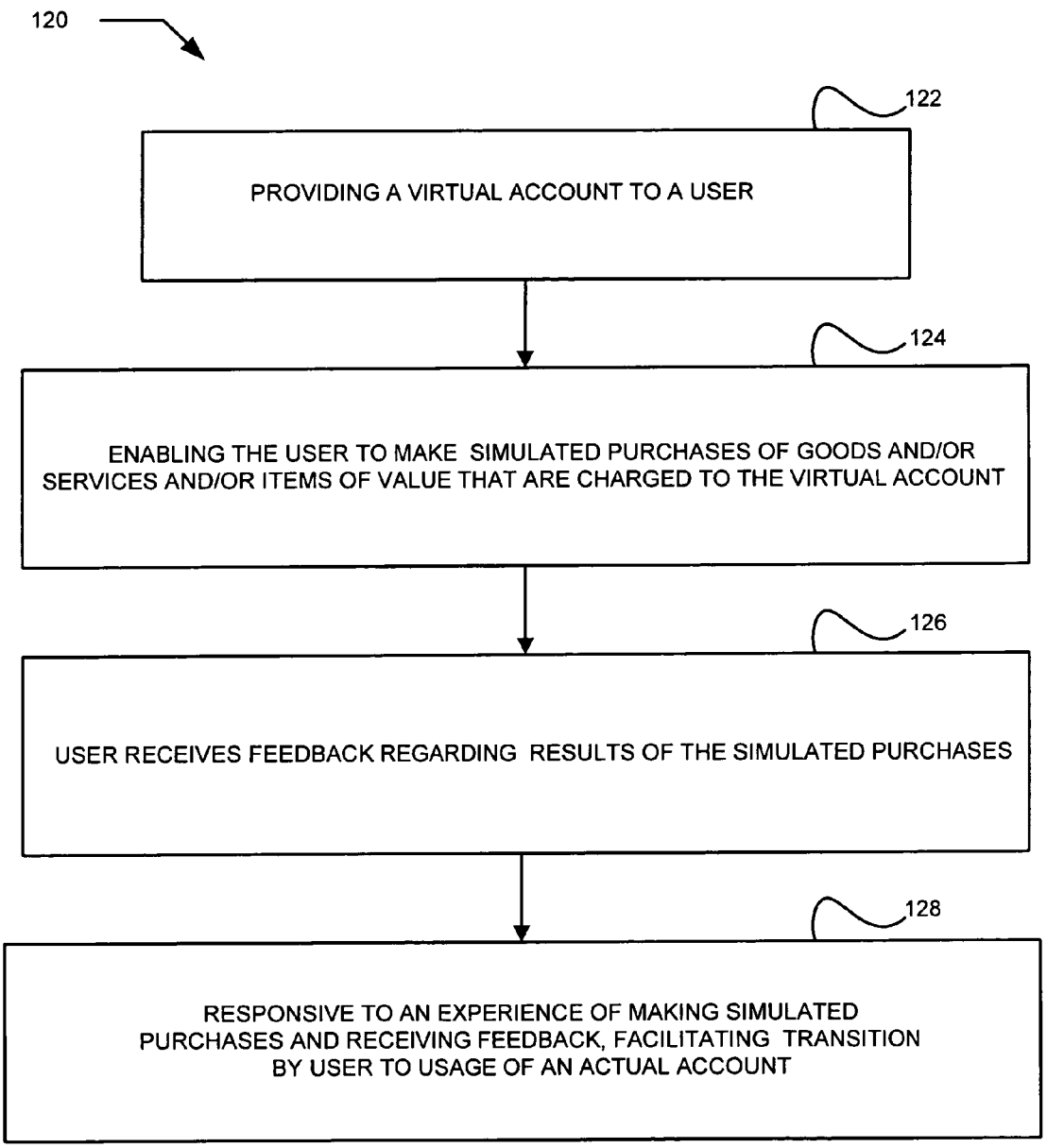
FIG. 2 is another high level flow chart showing a different exemplary process for other embodiments.

Another process 120 shown in the exemplary flow chart of FIG. 2 provides a virtual account to a user (block 122). The user is enabled to make simulated purchases of goods and/or services and/or items of value that are charged to the virtual account (block 124). The user receives feedback (block 126) regarding results of the simulated purchases. Responsive to the user's experience of making simulated purchases and receiving feedback, a transition of the user to usage of an actual account is facilitated (block 128).

The processes of FIGS. 1 and 2 can be implemented with various types of technology, including but not limited to hardware, firmware and/or software systems based on computerized data communications and processing as discussed in more detail herein.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

Figure 3:
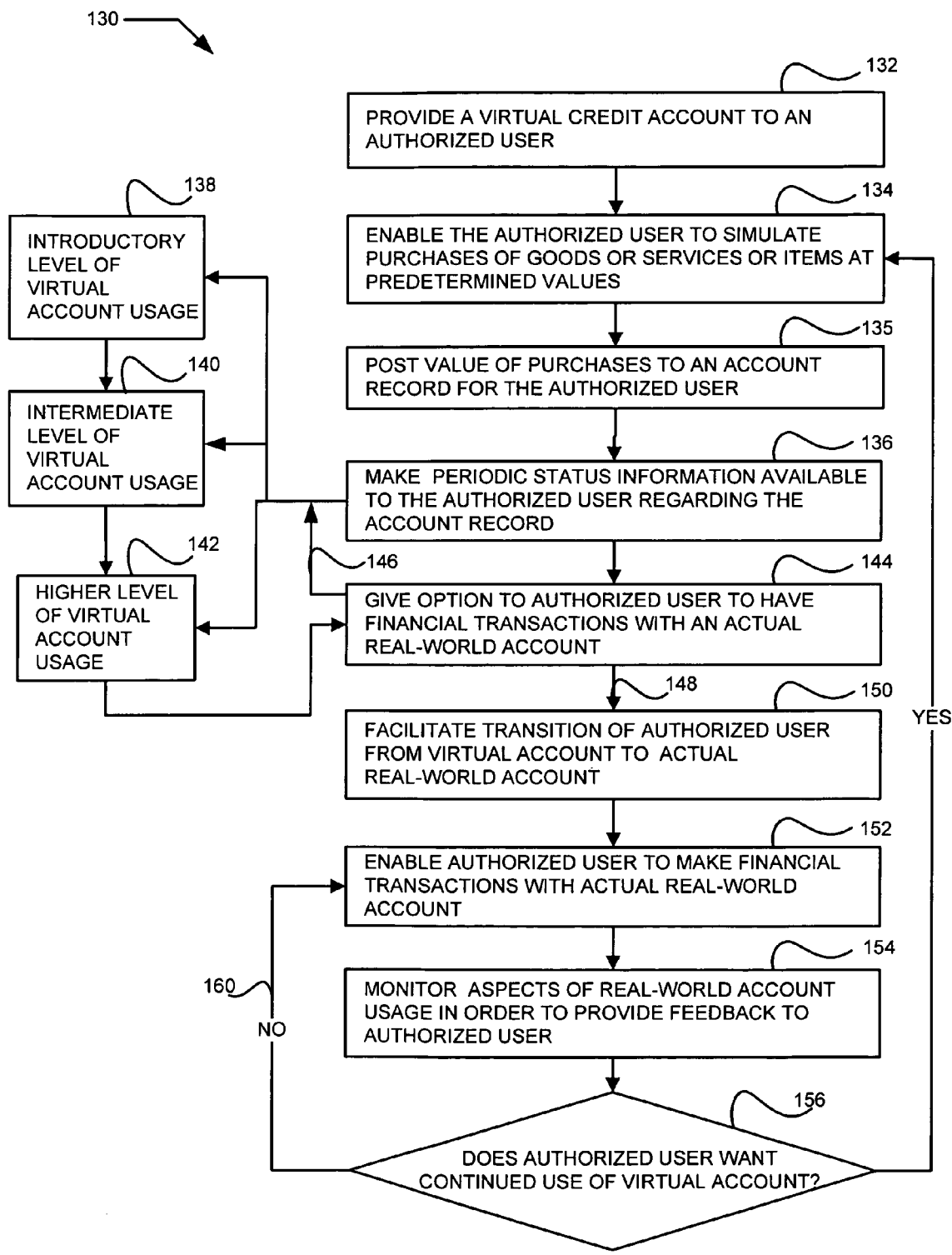
FIG. 3 is a more detailed flow chart showing a further exemplary process for additional embodiments.

A more detailed exemplary flow chart of FIG. 3 shows a process 130 involving alternative usage of both a virtual credit account and a real-world account. As an initial step for new users, a virtual credit account is provided to an authorized user (block 132). The authorized user is enabled to simulated purchases of goods or services or items at predetermined values (block 134). The value of the purchases is posted to an account record (block 135). Periodic feedback including status information is made available to the authorized user regarding the virtual credit account record (block 136).

Various levels of participation are provided for usage of the virtual credit account. Of course any number of levels with different types of credit opportunities for virtual account usage could be incorporated into embodiments, perhaps depending upon the desired financial, educational, and entertainment goals of a system designer as well as possibly depending upon the skill, experience and sophistication of the authorized user. By way of example only, the illustrated process 130 of FIG. 3 includes an introductory level (block 138), an intermediate level (block 140) and a higher level (block 142). After participating in one or more levels of virtual account usage, an authorized user is given an option to have financial transactions with an actual real-world account (block 144). The authorized user may choose to continue (see arrow 146) using the virtual credit account, or take the option (see arrow 148) for transition to the actual real-world account. In some embodiments, the user may have an unrestricted option to make the transition to the actual real-world account. Some embodiments may allow the user to have the option of using either the virtual credit account or an actual financial account during given time periods.

If the option for transition to the actual real-world account is exercised, the transition of the authorized user is facilitated from the virtual credit account to the actual real-world account (block 150). The authorized user can then be enabled to make financial transactions with the actual real-world account (block 152). Aspects of usage of the real-world account may be monitored (block 154) in order to provide feedback to the authorized user. It is to be emphasized that usage of the real-world account does not preclude continued use of the virtual credit account. If the authorized user wants to continue use of the virtual credit account (block 156), then such continued use is made available (see arrow 158). Continued use of the real-world account is also made available (see arrow 160).

Figure 4:
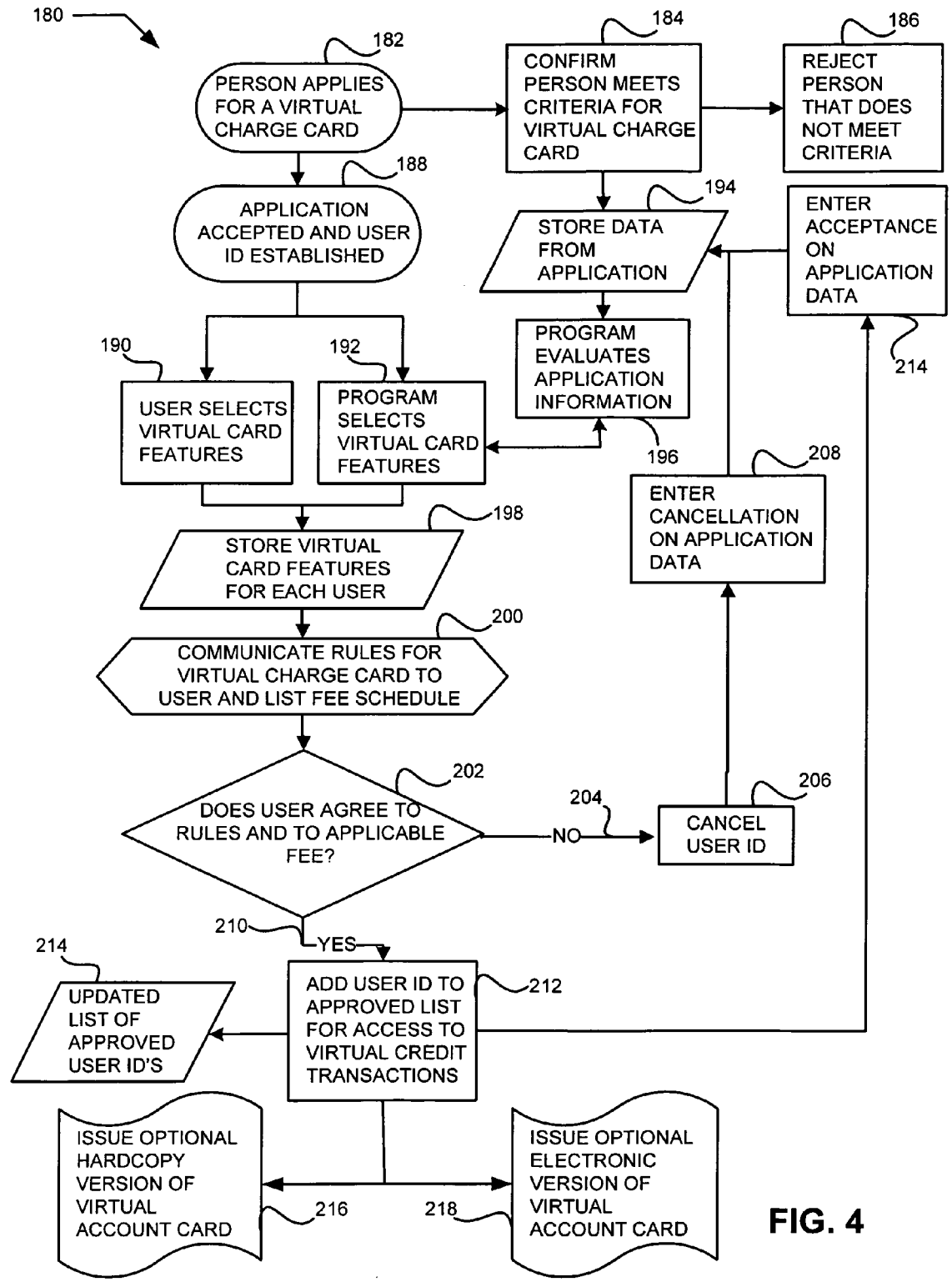
FIG. 4 is another more detailed flow chart showing an exemplary application process for a virtual charge card.

The detailed exemplary flow chart of FIG. 4 shows a process 180 for implementing an application procedure for a virtual charge card. A person who is not already an authorized user can make application (block 182) for a virtual charge card. An evaluation or screening confirms whether or not the person meets predetermined criteria (block 184) for having the virtual charge card. Persons that do not meet the criteria are rejected (block 186). When a person does meet the criteria, their application is accepted and a user ID established (block 188).

In some instances the virtual card features such as credit terms, payment terms, penalties, benefits, and the like may be selected by the user (block 190). In other instances a program may select the virtual card features (block 192), which features may be determined from stored application data (block 194) that is evaluated by the program (block 196). The virtual card features that are selected for each user are stored (block 198) for future reference. Where virtual account terms for a virtual card are being programmed for a new user, such programming may be based on user demographic information.

As part of the application procedure, a fee schedule and virtual card rules are presented to the user (block 200) for consideration. In order to continue the application process, the user decides whether to agree to the rules and applicable fees (block 202). If no agreement occurs (see arrow 204), the use ID is canceled (block 206), and the cancellation is entered (block 208) for storage with the other application data. If agreement is confirmed (see arrow 210), the user ID is added to the approved list (blocks 212, 214) that controls the access to virtual credit transactions involving the virtual credit cards, and the acceptance is also entered (block 214) for storage with the other application data.

A further feature offered to an approved user is the optional issuance of a hardcopy version of the virtual account card (block 216), and also the optional issuance of an electronic version of the virtual account card (block 218).

Figure 5:
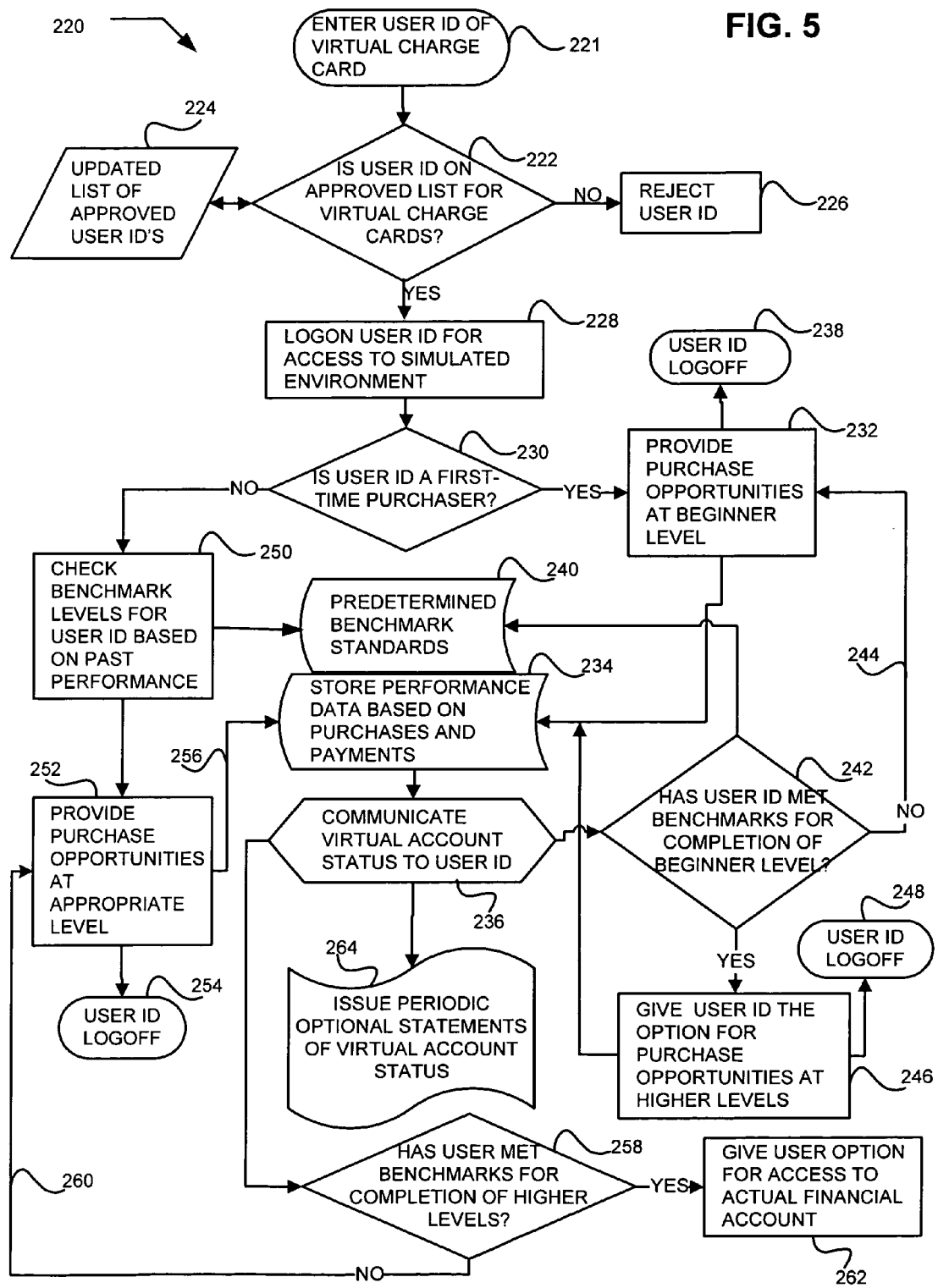
FIG. 5 is a detailed flow chart showing an exemplary manner of using a virtual charge card.

The detailed exemplary flow chart of FIG. 5 shows a process 220 for incorporating benchmark completion as a basis for giving an authorized user the option of having access to an actual financial account. A person is requested to enter the user ID (block 221) of a virtual charge card. The user ID is processed (block 222) to determine whether it is on an updated approved list (block 224). If not found on the updated approved list, the user ID is rejected (block 226). If found on the update approved list, the user ID is approved for logon to have access to a simulated environment (block 228).

A determination may be made to detect a user ID that is a first-time purchaser (block 230). If so, purchase opportunities are made available to the user ID at a beginner level (block 232). Any purchases and/or payments involving the virtual charge card are stored (block 234) as part of a performance data base for future reference. In some instances, revised virtual account terms for the virtual charge card may be programmed based on past performance records maintained in the performance data base. The virtual account status is periodically communicated to the user (block 236). There is no urgency imposed on the user to advance to another participation level, and user logoff (block 238) is available from the beginner level.

A user at the beginner level in this embodiment qualifies for advancement to another participation level when it has been determined that such user has met predetermined benchmark standards (block 240) for completion of the beginner level (block 242). Upon failure to meet such a beginner level benchmark standard, the user can return (see arrow 244) to purchase opportunities at the beginner level. In the event the beginner level benchmarks standards have been met, the user ID is given the option for purchase opportunities at higher levels (block 246). User logoff (block 248) is also available to exit from such higher levels.

When an approved user ID is not a first-time purchaser, a query is made (block 250) to check the stored past performance data (block 234) as compared to the stored benchmark standards (block 240) for this particular user ID. Based on the results of the query, purchase opportunities are provided at the appropriate participation level (block 252), along with a previously described user ID logoff (block 254). Any purchases and/or payments involving virtual credit transactions at these higher participation levels are also stored (see arrow 256) in the performance data base (block 234). The virtual account status is also periodically communicated (block 236) to the users at these higher participation levels.

When a review (block 258) determines that benchmark standards for completion at higher levels have not been met, the user can return (see arrow 260) for further purchase opportunities at such higher levels. Upon satisfactory completion of the higher level benchmark standards, the user has an option for access to an actual financial account (block 262). It is noted that this process embodiment provides for the issuance of periodic optional statements (block 264) indicating the status of the virtual charge card accounts.

Figure 6:
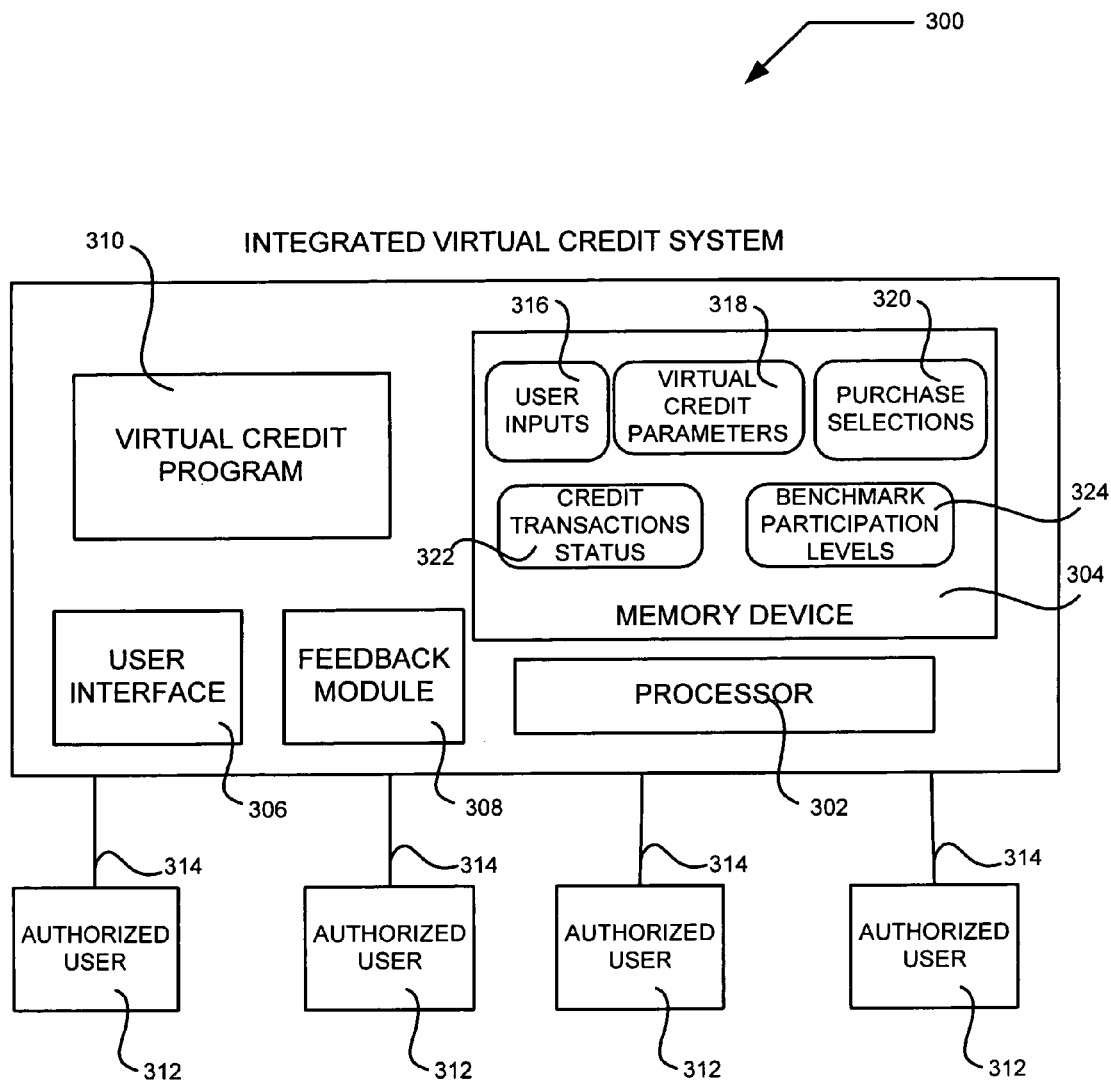
FIG. 6 is a schematic block diagram for an exemplary implementation of some embodiments.

Referring to the schematic block diagram of FIG. 6, an exemplary embodiment of an integrated virtual credit system 300 includes a processor 302, memory device 304, user interface 306, feedback module 308, and virtual credit program 310. A plurality of authorized users 312 who may be at different locations have bi-directional communication links 314 with the virtual credit system 300 in order to submit inputs via the user interface 306 and to receive informational messages from the feedback module 308. The virtual credit program 310 may include one or more computer program products with a carrier medium having program instructions thereon. Such computer program products may run on multiple computer devices or run on an integrated computer system, depending on the circumstances.

The memory device 304 provides re-writable storage capability associated with each authorized user 312. The various categories of data stored in the memory device 304 include user inputs 316, virtual credit parameters 318, purchase selections 320, credit transactions status 322, and benchmark participation levels 324. This system enables multiple users to make simulated purchases or incur simulated credit obligations that are associated with and posted to different virtual accounts. The multiple users are also enabled to make simulated compensation against balances due or obligations owed for the different virtual accounts.

Figure 7:
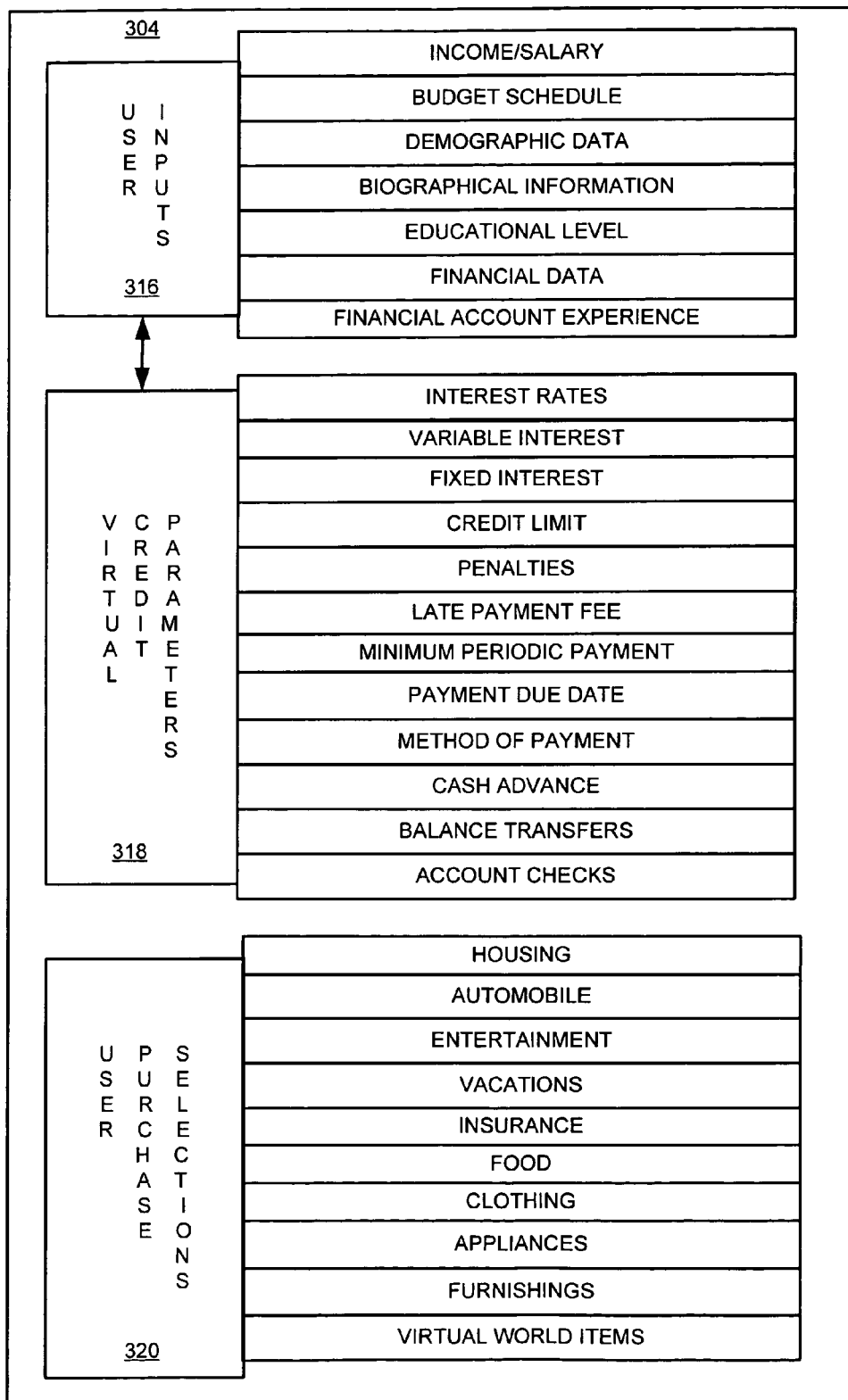
FIG. 7 is a schematic block diagram showing exemplary categories of informational data that may be involved in some embodiments.

The schematic block diagram of FIG. 7 shows an illustrative but not exhaustive list of data categories that can be accessed in the memory 304 by the user interface 306 and the feedback module 308. For example, user inputs 316 may include categories such as income/salary, budget schedule, demographic data, biographical information, educational level, financial, and financial account experience. As an additional example, virtual credit parameters 318 may include categories such as interest rates, variable interest, fixed interest, credit limit, penalties, late payment fee, minimum periodic payment, payment due date, method of payment, cash advance, balance transfers, and account checks. As a further example, user purchase selections 320 may include categories such as housing, automobile, entertainment, vacations, insurance, food, clothing, appliances, furnishings, and virtual world items.

Figure 8:
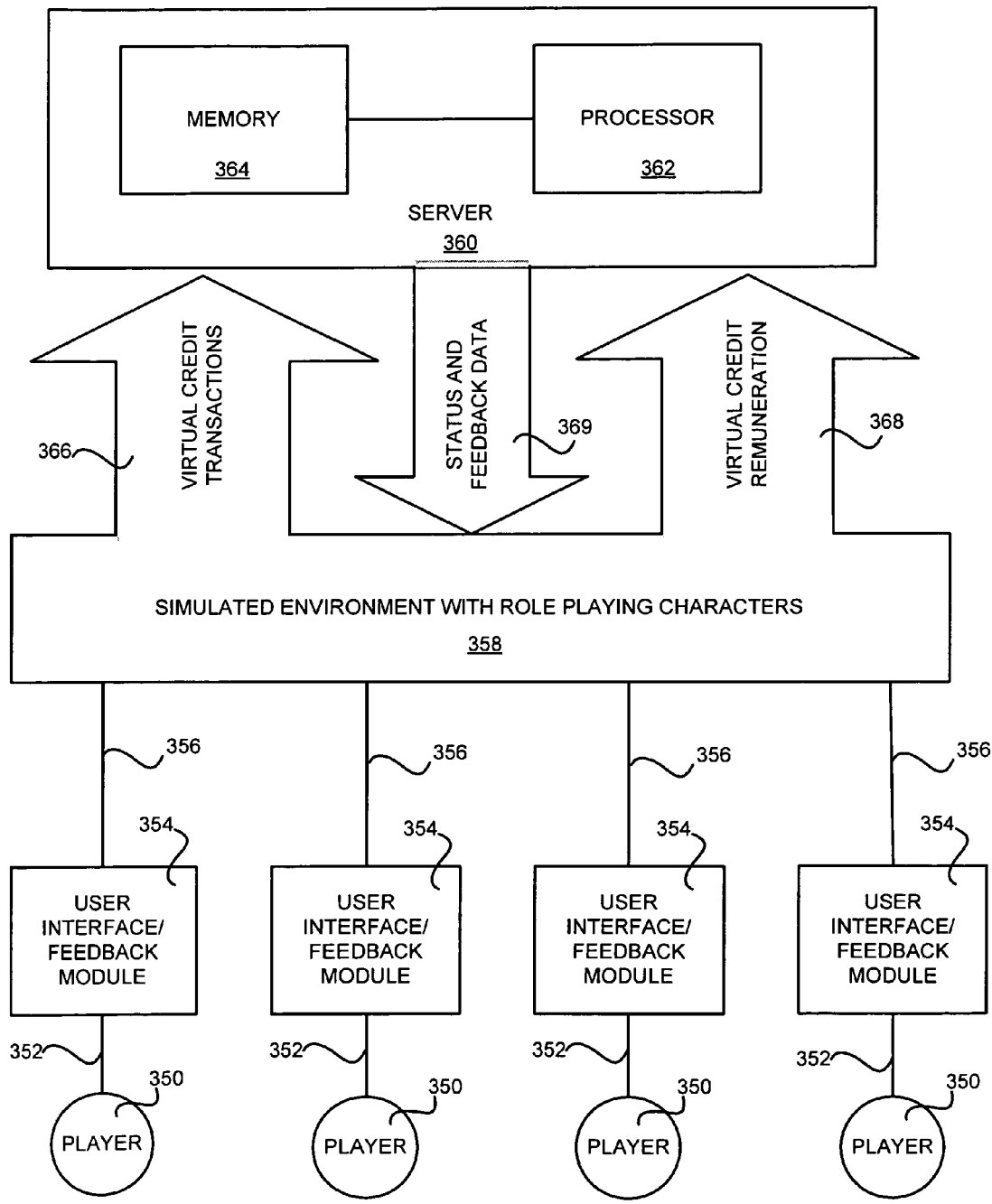
FIG. 8 is a schematic functional diagram showing a possible implementation in a simulated environment with role playing characters.

The schematic block diagram of FIG. 8 shows an exemplary embodiment for a multi-player system implemented in a simulated environment with role playing characters. Of course, other types of simulated environments have the capability for practicing the disclosed methods and techniques, particularly where multiple players interact with the simulated environment over extended periods of time. In many instances the players can logon for a period of participation, and from time to time logoff in order to carry out their real-world activities and obligations, sometimes perpetuating the fictional role playing over many weeks and months.

As shown in FIG. 8, individual players 350 have access via a first bi-directional communication link 352 to a user interface/feedback module 354 with connects through a second bi-directional communication link 356 to a simulated environment 358. Such players can interact with each other or with characters, events, purchase opportunities, competitions, and the like that are provided in the simulated environment 358. The bi-directional communication links also serve to provide player access to products and/or services and/or other items of value that can be acquired pursuant to a virtual credit arrangement.

A server 360 includes a processor 362 connected with a memory 364 in order to receive, store, update, process, and transmit information data and messages regarding virtual credit arrangements related to the simulated environment 358. In that regard, various details regarding virtual credit transactions are transmitted through a third communication link 366 to the server 360. Similarly various details regarding virtual credit remuneration or compensation are transmitted through a fourth communication link 368 to the server. Another communication link 369 enables status and feedback information to be communicated back to the simulated environment 358, and in some instances back to the players 350.

Figure 9:
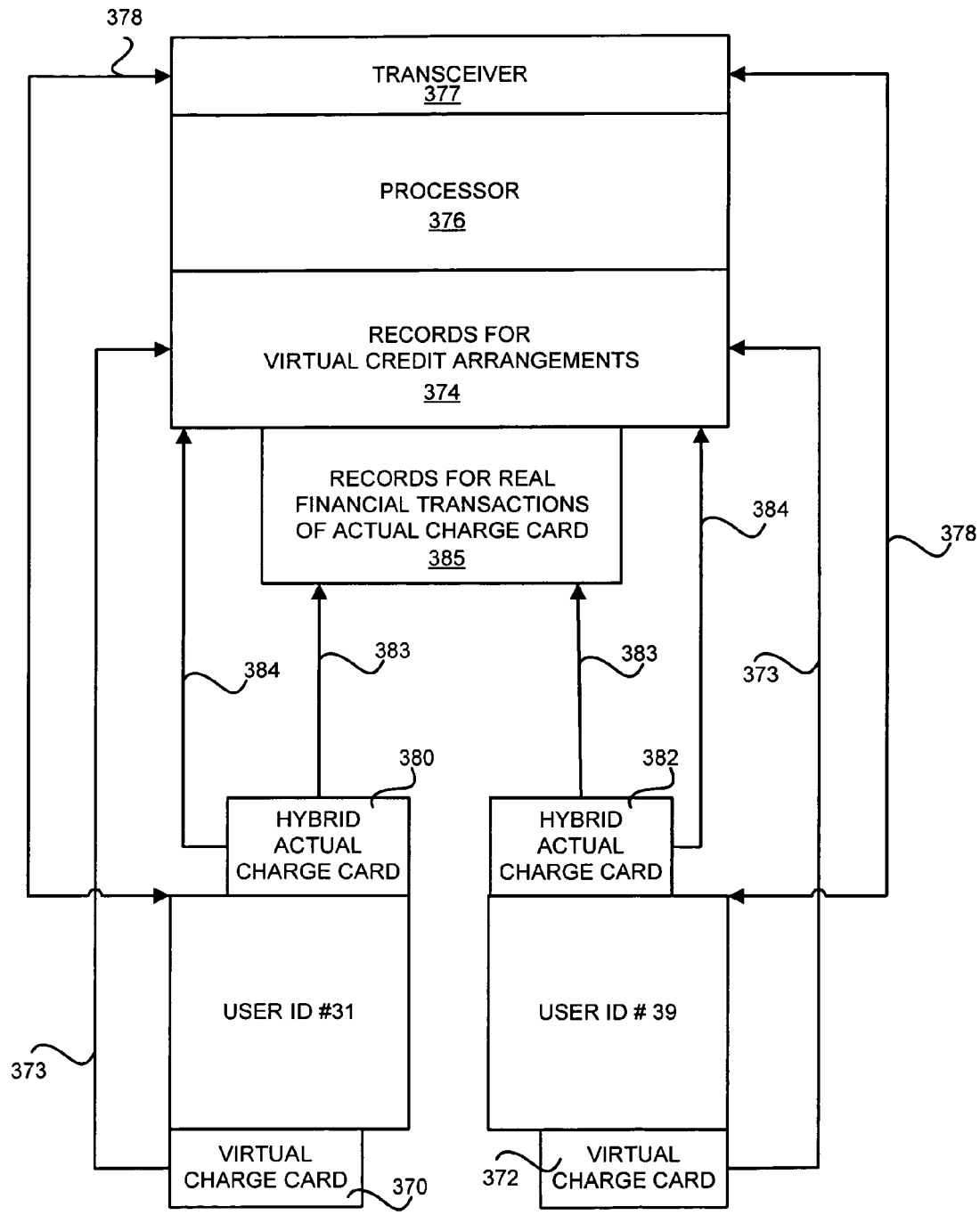
FIG. 9 is a schematic functional diagram for an exemplary system that embodies various features.

The schematic block diagram of FIG. 9 shows an exemplary embodiment wherein multiple users (e.g., user ID #31 through user ID #39) can use virtual accounts such as virtual charge cards 370, 372 in order to participate in virtual financial transactions. When the virtual charge card is used, a record of the transaction is transmitted as indicated by arrows 373 for storage in a memory device 374 that keeps records for virtual credit arrangements. A processor 376 is operatively coupled to the memory device 374 and also to a transceiver 377 for bi-directional communication regarding the virtual financial transaction through link 378 with the users #31 through #39.

These same users #31 through #39 also have access to hybrid actual charge cards 380, 382 in order to participate in actual real-world financial transactions. When the hybrid actual charge card is used, a record of the transaction is transmitted as indicated by arrows 383 for storage in a memory device 385 that keeps records for real financial transactions. Such real financial transactions may or may not be related to a virtual credit arrangement. However in some instances the hybrid actual charge card usage may be directly or indirectly related to a virtual credit arrangement, including but not limited to down payments, guarantees, compensation, renegotiation, resolution, transferability, etc. The details of such relationship will be communicated to the virtual credit arrangements storage memory device 374 as indicated by arrows 384. The bi-directional communication link 378 serves shared functional purposes for both the virtual charge card and the actual charge card, including but not limited to transmitting messages regarding credit terms associated with each different user ID account as well as feedback and status information for purchases, payments, negotiations, remuneration, and resolution involving the virtual credit arrangements.

It will be understood that the processor 376 and bi-directional link 378 are also operatively coupled with the memory device 385 in order to provide bi-directional communication regarding hybrid charge card transactions through link 378 with the users #31 through #39. Such communications may include the results or consequences of purchases and/or payments made regarding the actual charge card transactions. Such communications may also relate to terms of a credit transaction.

It will be further understood that all of the references herein to communication links with virtual account users and real-world account users may include interactive communications involving question/answer sequences, prompt/selection sequences, option/choice sequences, and the like.

It will also be understood by those skilled in the art that the various communication links can be separated into different communication channels or media as well as combined into an integrated broadband or narrowband link such as wired, wireless, cable, etc. It is further understood that integrated or separate modules can be provided for user interface functions and/or for feedback functions. The particular exemplary systems disclosed herein are provided only for illustration.

Figure 10:
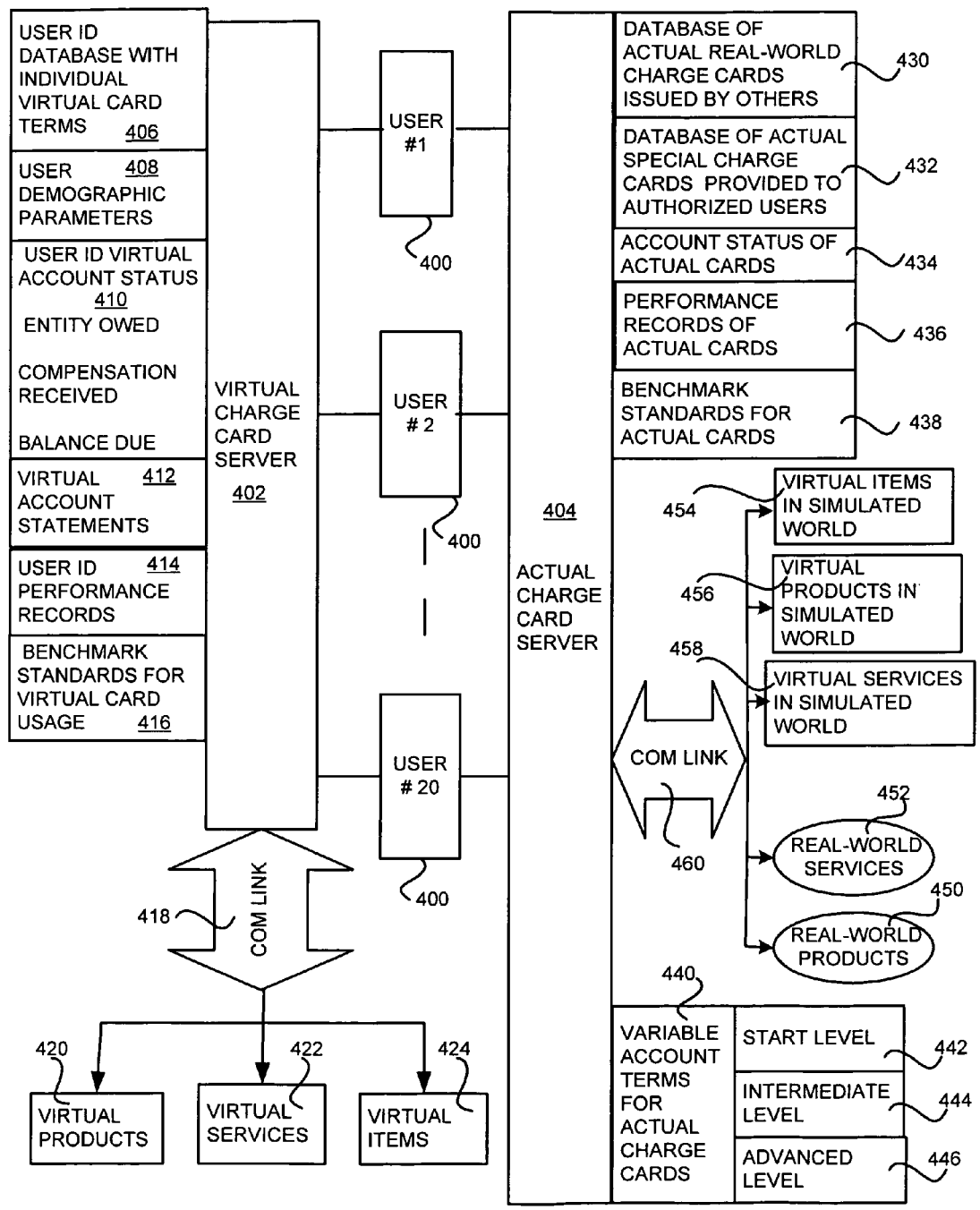
FIG. 10 is a more detailed schematic functional diagram for some embodiments that incorporate virtual charge cards and real-world charge cards.

Referring to the schematic block diagram of FIG. 10, a plurality of persons 400 (e.g., user #1, user #2 through user #20) have access to both a virtual charge card server 402 and an actual charge card server 404. The disclosed system provides for monitoring any action taken to make resolution or provide compensation that may be required by a virtual credit arrangement.

The embodiment of FIG. 10 provides a server apparatus including a memory and a processor for maintaining information regarding credit transactions involving purchases by a user of various virtual products and/or services and/or virtual items. A bi-directional user interface is provided for exchanging information messages between the user and the server apparatus regarding credit terms associated with the purchases. As described in more detail herein, the embodiment of FIG. 10 is an exemplary implementation of a system and method wherein credit transactions are capable of resolution by virtual-world compensation and by real world compensation.

The access shown for the multiple users in FIG. 10 is for purposes of illustration, and persons skilled in the art will understand that various types of communication links can be utilized to achieve the necessary functional data and message exchanges between the users and the computerized data processing and storage systems exemplified by the servers.

Also, various types of virtual credit arrangements and real-world financial accounts can be incorporated into the type of system as disclosed herein. In some instances, specific terms of a virtual credit arrangement or transaction may be based on one or more factors such as demographic information, financial account records, experience levels, completion of performance benchmarks, role play world activities, and user negotiations.

The virtual charge card server 402 includes various predetermined data records as well as other dynamically updated records that are used by the server to help provide virtual credit services based on different types of credit arrangements and accounts. Exemplary categories of records available to the virtual charge card server 402 include user ID data and related individual virtual card terms 406, user demographic parameters 408, user ID virtual account status data 410 (e.g., entity/person owed, compensation already received, and remaining balance due), virtual account statements 412, user ID performance records 414, and benchmark standards for virtual card usage 416.

A bi-directional communication link 418 enables the users 400 to have access for engaging in credit transactions involving virtual products 420, virtual services 422, and virtual items 424. When a credit transaction has been completed based on advertised or negotiated terms, the informational details are transmitted via communication link 418 to the server for appropriate processing and storage. This allows any balance due or obligation owed to be posted to the user's virtual credit account. When remuneration is made by one of the multiple users with something of real value against such balances due or obligations owed, such activity is also posted to the appropriate virtual credit account.

The actual charge card server 404 includes various predetermined data records as well as other dynamically updated records that are used by the server to help provide actual credit services based on different types of credit arrangements and accounts. Exemplary categories of records available to the actual charge card server 404 includes a database 430 of actual real-world charge cards issued to users by others such as third party issuers, a database 432 for actual special charge cards provided to authorized users, account status records 434 for actual charge cards, and performance records 436 for actual charge cards. These records help to identify actual real-world accounts selected by a user, including the actual special charge cards created for the user.

Other categories of records include benchmark standards 438 for actual charge cards, and variable account terms 440 for actual charge cards. These variable account terms 440 may be divided between exemplary levels such as start level accounts 442, intermediate level accounts 444, and advanced level accounts 446. The actual charge card server 404 may enable a user to have an option to move between different participation levels. In some instances completion of performance benchmarks may be required before allowing the user to move to a high participation level.

Many of the functional capabilities and possibilities attributable to virtual credit accounts may also be provided to actual hybrid charge card accounts. For example, the user may be enabled to vary one or more of the credit terms such as interest rate, due date, grace period, penalties, credit limit, service charge, transferability, weekly or monthly or annual fees, automatic repayment, payment of other obligations, monetary advance, re-negotiated debt, and exchange value.

Some of the actual charge cards are primarily suitable for use in purchasing real-world products 450 and real-world services 452. This may especially be true of actual charge cards issued by third parties. However, some actual financial accounts issued by third parties as well as some actual special cards such as hybrid cards described herein may also have capability to purchase or otherwise become involved in transactions related to simulated credit arrangements such as simulated purchases of virtual world items 454, virtual world products 456, and virtual world services 458. As indicated in the drawing, such virtual items, products and/or services may often be found in a simulated environment such as a role playing fictional world. A bi-directional communication link 460 enables the users to engage in the various credit transactions, and provide for transaction details to be processed by the actual charge card server 404 and stored or updated in the appropriate database.

It will be understood from the embodiments of FIGS. 9 and 10 that hybrid charge accounts can be associated with a plurality of users, respectively, for use with credit transactions involving purchases of various virtual products and/or virtual services and/or virtual items. Furthermore, an aspect of the disclosed methods and systems for hybrid charge accounts provides for their credit terms to be established or changed based at least partially on user selections, demographics, user performance, user experience, and/or benchmark parameters.

The embodiments of FIGS. 8, 9 and 10 further illustrate computer apparatus that provides virtual credit including storing and processing virtual credit transactions involving products or services or items that are available in a simulated environment. An interactive communication link with the computer apparatus enables a user to participate in the virtual credit transactions. A user interface is capable of operable connection to the interactive communication link in order for the user to transmit informational inputs and to make selections that help to provide a basis for credit terms of the virtual credit transactions.

The interactive communication link also enables the user to make remuneration of a debt or an obligation resulting from the virtual credit transactions. Such remuneration may be in the form of real-world money or fictional-world money.

Based on the foregoing descriptions and drawing disclosures of exemplary embodiments, many new and advantageous features provide benefit to the virtual credit account users, as well as benefits to the entities that provide financial account services, and benefits to entities that provide simulated role playing environments. In that regard, some embodiments enable multiple users to make remuneration with something of virtual value against balances due or obligations owed for virtual credit accounts. In some embodiments multiple users can make remuneration with something of real value as resolution of virtual debts or obligations.

Features disclosed herein also include billing simulated purchases to a virtual account that allows carry-over balances. Feedback is communicated to the user regarding results of carry-over balances such as non-payment, partial payment, and full payment of balances due. Feedback is also communicated to the user regarding consequences of related purchase and payment activity for virtual credit accounts. In some instances, the system and method provides monitoring of actions taken to make resolution or provide compensation required by a virtual credit account arrangement.

Other features include periodically changing various credit terms for a virtual credit arrangement, such as interest rates, due dates, grace periods, penalties, credit limits, service charges, transferability, weekly or monthly or annual fees, automatic repayment provisions, payment of other obligations, monetary advances, re-negotiation of the debt, and exchange value as compared to real-world or fictional money.

In certain instances, the user may have the option to vary one or more of these virtual account terms.

Various types of virtual credit accounts as well as actual financial accounts can be incorporated into the disclosed methods, processes, systems and apparatus including accounts allowing carry-forward balance, accounts requiring full payment, debit cards, accounts with free benefits, accounts with extra-cost benefits, accounts providing discount promotions, cash advance accounts, accounts with beneficial links, insurance product accounts, accounts with value added benefits, business and financial institution charge cards, checking accounts, lines of credit, vouchers, and installment promissory notes accounts.

Performance benchmarks for virtual credit arrangements or accounts in accordance with certain aspects of the disclosure herein may be based on the credit record of virtual accounts; credit record of real financial accounts, test results, fictional role playing achievements, fictional role playing skills acquired, previous experience, endorsements, and group memberships in real world and role playing environments. Completion of such performance benchmarks may be required before allowing the transfer to a higher participation level, and also before facilitating transition of the user to an actual financial account. Such performance benchmarks may be based on activities of the user in a role playing environment.

It is to be understood that different categories of purchases may be available to be charged to a virtual credit account, such as travel reservations, auctions, food, clothing, merchandise, vehicles, insurance, appliances, furnishings, recreation, competitions, other items having virtual monetary value, installment purchases, entertainment, rentals, education, books, publications, games, other items having real monetary value, and fictional role playing items.

Some embodiments contemplate using a simulated billing period for virtual credit account that occurs in real time at various intervals, such as a month, a week, a day, an hour, or lesser periods. The simulated billing period may be based on various parameters such as the number of purchase transactions, average balance owed, highest balance owed, user's age, user's education, user's experience level, and user's benchmark performance.

Virtual account terms can be based on various informational data, such as demographic information, past performance records, user negotiations, and choices selected by users. The terms of usage of hybrid charge accounts capable of both virtual account activities and real-world financial transactions can be established or changed based at least partially on user selections, user demographics, as well as other factors that are also used for determining virtual credit account terms.

Although the virtual credit arrangements may primarily involve transactions involving real-world money and/or fictional world money, some embodiments clearly contemplate virtual credit arrangements and accounts that may require remuneration with a non-monetary real-world item or action, as well as remuneration with a non-monetary fictional world item or action.

In some preferred embodiments, computerized components and systems enable multiple users to make purchases or incur obligations associated with different virtual credit accounts. Also such computerized implementations enable multiple users to provide compensation against balances due or obligations owed for different virtual accounts.

The exemplary system and apparatus embodiments shown in FIGS. 6-10 along with other components, devices, know-how, skill and techniques that are known in the art have the capability of implementing and practicing the methods and processes shown in FIGS. 1-5. It is to be understood that the methods and processes can be incorporated in one or more computer program products with a carrier medium having program instructions thereon. However it is to be further understood that other systems, apparatus and technology may be used to implement and practice such methods and processes.

Those skilled in the art will recognize that the various aspects of the embodiments for methods, processes, apparatus and systems as described herein can be implemented, individually and/or collectively, by a wide range of hardware, software, firmware, or any combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Although various features have been described in considerable detail with reference to certain preferred embodiments, other embodiments are possible. Therefore, the spirit or scope of the appended claims should not be limited to the description of the embodiments contained herein.

The invention claimed is:

1. A non-transitory computer-readable storage medium comprising an executable program stored thereon, wherein the program instructs a microprocessor to perform the following steps:
   providing a virtual credit arrangement in a virtual world environment that enables a user to have a simulated credit transaction;
   communicating feedback to the user regarding results of said simulated credit transaction;
   responsive to the simulated credit transaction, providing the user an option to make remuneration with something of real value against a balance due or an obligation owed in connection with said virtual credit arrangement; and
   facilitating a transition by the user from the virtual credit arrangement to an actual financial account, further including:
   requiring completion of a performance benchmark in the virtual world environment before facilitating the transition by the user to the actual financial account.

2. The non-transitory computer-readable storage medium of claim 1 that further includes:
   enabling multiple users to make one or more simulated credit purchases or incur a simulated credit obligation posted to a virtual account, and enabling the multiple users to make real-world compensation against a balance due or an obligation owed for said virtual account.

3. The non-transitory computer-readable storage medium of claim 2 that further includes:
   enabling the multiple users to make remuneration with something of real value against a balance due or an obligation owed for said virtual account.

4. The non-transitory computer-readable storage medium of claim 1 that further includes
   communicating feedback to the user regarding a consequence of a real-world financial transaction related to said virtual credit arrangement.

5. The non-transitory computer-readable storage medium of claim 2 that further includes:
   billing said one or more simulated credit purchases to a virtual account that allows a carry-over balance.

6. The non-transitory computer-readable storage medium of claim 5 that further includes:
   communicating feedback to the user regarding a result of at least one of the following types of information for said virtual account: non-payment, partial payment, and full payment of balances due.

7. The non-transitory computer-readable storage medium of claim 1 that further includes:
   identifying or creating an actual real-world account selected by said user for engaging in one or more real-world financial transactions related to said virtual credit arrangement.

8. The non-transitory computer-readable storage medium of claim 7 that further includes:
   communicating to the user a consequence of any credit purchase and/or any payment made based on remuneration made from said actual real-world account.

9. The non-transitory computer-readable storage medium of claim 1 that further includes:
   monitoring any action taken to make resolution by real-world compensation that is required by said credit arrangement.

10. The non-transitory computer-readable storage medium of claim 1 that further includes:
    periodically changing credit terms for said virtual credit arrangement.

11. The non-transitory computer-readable storage medium of 10 that further includes:
    periodically changing for said virtual credit arrangement one or more credit terms from the following group: interest rate, due date, grace period, penalties, credit limit, service charge, transferability, weekly fee, monthly fee, annual fee, automatic repayment, payment of other obligations, monetary advance, re-negotiated debt, and exchange value.

12. The non-transitory computer-readable storage medium of claim 1 that further includes:
    providing a bi-directional communication link for one or more messages to and from the user.

13. The non-transitory computer-readable storage medium of claim 1 that further includes:
    providing a communication link between the user and a virtual world environment having one or more products and/or services and/or other items of virtual value that can be acquired by said virtual credit arrangement.

14. The non-transitory computer-readable storage medium of claim 1 that includes:
    enabling a user to make remuneration from an actual real-world account issued by a third party.

15. The non-transitory computer-readable storage medium of claim 1 that further includes:

providing assistance for said user to obtain an actual real-world account for engaging in one or more real-world financial transactions relating to said virtual credit arrangement.

16. The non-transitory computer-readable storage medium of claim 2 that further includes:
issuing an electronic charge card version of said virtual account.

17. The non-transitory computer-readable storage medium of claim 1 that further includes:
providing one or more communication links to the virtual world environment that are accessible by a plurality of users at different locations, respectively.

18. A non-transitory computer-readable storage medium with an executable program stored thereon, wherein the program instructs a microprocessor to perform the following steps:
providing a virtual credit account in a virtual world environment;
enabling a user to make a simulated purchase of virtual goods and/or virtual services and/or items of virtual value that are charged to the virtual credit account; providing feedback to the user regarding a result of the simulated purchase; and
responsive to making the simulated purchase and receiving the feedback, facilitating a transition by the user from the virtual credit account to usage of an actual financial account to make real-world compensation against a balance due or obligation owed for the virtual credit account, further including:
requiring completion of a performance benchmark in the virtual world environment before facilitating a transition by the user to usage of the actual financial account.

19. The non-transitory computer-readable storage medium of claim 18 wherein said providing a virtual credit account further includes:
providing one or more of the following type of virtual financial accounts: accounts allowing carry-forward balance, accounts requiring full payment, debit cards, accounts with free benefits, accounts with extra-cost benefits, accounts providing discount promotions, cash advance accounts, accounts with beneficial links, insurance product accounts, accounts with value added benefits, business-issued charge cards, financial institution charge cards, checking accounts, lines of credit, vouchers, and promissory notes.

20. The non-transitory computer-readable storage medium of claim 18 wherein said facilitating usage of an actual financial account further includes:
providing access to one or more of the following type of actual financial accounts: accounts allowing carry-forward balance, accounts requiring full payment, debit cards, accounts with free benefits, accounts with extra-cost benefits, accounts providing discount promotions, cash advance accounts, accounts with beneficial links, insurance product accounts, accounts with value added benefits, business-issued charge cards, financial institution charge cards, checking accounts, lines of credit, vouchers, and promissory notes.

21. The non-transitory computer-readable storage medium of claim 18 that further includes:
allowing said user to have option of using the virtual credit account during one or more given time periods.

22. The non-transitory computer-readable storage medium of claim 18 that includes:
providing different participation levels for usage of said virtual credit account.

23. The non-transitory computer-readable storage medium of claim 22 that further includes:
requiring completion of a performance benchmark before allowing transfer to a different participation level for said virtual credit account.

24. The non-transitory computer-readable storage medium of claim 23 that further includes:
basing the performance benchmark on one of more of the following group: credit record of virtual accounts; credit record of real financial accounts, test results, fictional role playing achievements, fictional role playing skills acquired, experience levels, endorsements by others, group memberships in real world, and group memberships in role playing environment.

25. The non-transitory computer-readable storage medium of claim 18 that further includes:
requiring completion of a performance benchmark that is based on one of more of the following group: credit record of virtual accounts; participation levels of virtual accounts, credit record of real financial accounts, test results, fictional role playing achievements, fictional role playing skills, role playing experience, endorsements by others, group memberships in real world, and group memberships in role playing environment.

26. The non-transitory computer-readable storage medium of claim 25 that further includes:
requiring completion of a performance benchmark that is based on one or more activities of the user in a role playing environment.

27. The non-transitory computer-readable storage medium of claim 18 that further includes:
providing one of more of the following different categories of purchases available to said virtual credit account: travel reservations, auctions, food, clothing, merchandise, vehicles, insurance, appliances, furnishings, recreation, competitions, virtual monetary value, real monetary value, installment purchases, entertainment, rentals, education, and fictional role playing items.

28. The non-transitory computer-readable storage medium of claim 18 that further includes:
providing a simulated billing period for said virtual credit account that occurs in at least one of the real-time intervals taken from the following group: a month or less, a week or less, a day or less, an hour or less.

29. The non-transitory computer-readable storage medium of claim 28 that further includes:
providing the simulated billing period based on a combination of one or more parameters from the following group: average balance owed, highest balance owed, number of simulated purchase transactions, age of user, education of user, experience level, and benchmark performance.

30. The non-transitory computer-readable storage medium of claim 18 that further includes:
allowing an option to vary one or more virtual credit account terms from the following group: interest rate, due date, grace period, penalties, credit limit, service charge, transferability, weekly fee, monthly fee, annual fee, automatic repayment, payment of other obligations, monetary advance, re-negotiated debt, and exchange value.

31. The non-transitory computer-readable storage medium of claim 18 that further includes:
programming one or more virtual credit account terms based on user demographic information.

32. The non-transitory computer-readable storage medium of claim 18 that further includes:

programming one or more virtual credit account terms based on past performance records.

33. The non-transitory computer-readable storage medium of claim 18 that further includes:

enabling usage of an actual financial account issued by a third party for a financial transaction to make real-world compensation related to the simulated purchase charged to the virtual credit account.

34. The non-transitory computer-readable storage medium of claim 18 that further includes:

providing one or more communication links to the virtual world environment that are accessible by a plurality of users at different locations, respectively.

* * * * *

UNITED STATES PATENT AND TRADEMARK OFFICE
CERTIFICATE OF CORRECTION

| | | |
|---|---|---|
| PATENT NO. | : 7,890,419 B2 | Page 1 of 1 |
| APPLICATION NO. | : 11/974515 | |
| DATED | : February 15, 2011 | |
| INVENTOR(S) | : Jung et al. | |

It is certified that error appears in the above-identified patent and that said Letters Patent is hereby corrected as shown below:

Column 14, Line 44: add the word "claim" between "of" and "10"

-It should read: ". . . of claim 10 that further includes: . . ."

Column 16, lines 8-9: replace the word "of" with the word "or" in the phrase "on one of more" and add an "s" to the word "group"

-It should read: "on one or more of the following groups:"

Column 16, line 18: replace the word "of" with the word "or" in the phrase "on one of more" and add an "s" to the word "group"

-It should read: "on one or more of the following groups:"

Signed and Sealed this
Twenty-first Day of June, 2011

David J. Kappos
*Director of the United States Patent and Trademark Office*